Patented June 24, 1930

1,766,952

UNITED STATES PATENT OFFICE

KENNETH HERBERT SAUNDERS, OF MANCHESTER, ENGLAND, ASSIGNOR TO BRITISH DYESTUFFS CORPORATION LIMITED, OF MANCHESTER, ENGLAND

INTERMEDIATE DERIVED FROM AMINOSULPHONES

No Drawing. Original application filed August 31, 1928, Serial No. 303,371, and in Great Britain October 21, 1924. Divided and this application filed October 10, 1929. Serial No. 398,805.

In my application Serial No. 53,404 filed August 29, 1925, I have described a new series of azo and poly-azo dyestuffs and processes of manufacturing of these new dyestuffs, and in another application Serial No. 303,371, filed August 21, 1928 as a continuation in part, I have described certain intermediates useful in making these dyes. The present specification carries matter occurring in both said applications and it relates to intermediates for making these dyes.

The present application relates to amino sulphones obtained by reducing the nitrosulphones described in the said specification Serial No. 53,404, obtained by reducing sulphon chlorides of the aromaticohydrxy-carboxylic acids to sulphonic acids, which, in the presence of an aromatic nitro compound having a labile halogen atom, yield new nitrosulphones, some of which are described in the above-mentioned application. The new nitrosulphones described contain either one or two nitro groups, which may be reduced to the corresponding aminosulphones. In reducing the dinitrosulphones either one or both of the nitro groups may be reduced.

The new amino sulphone intermediates to which the present invention relates can be represented by the following probable formula

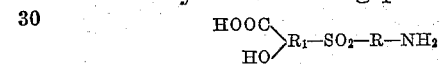

wherein $R_1$ represents a benzene residue and R represents a benzene or naphthalene residue, both of which may be further substituted, and in which the $-OH$ and $-COOH$ groups are ortho to each other. As explained in my prior and copending application, Ser. No. 53,404, intermediates of this type having an amino group on one portion of the molecule and a mordant-fixing group on another portion of the molecule with the two portions separated and united by $-SO_2-$, are useful in making azo dyestuffs not changing shade in mordanting.

Typical mono and diamino sulphones there described are:

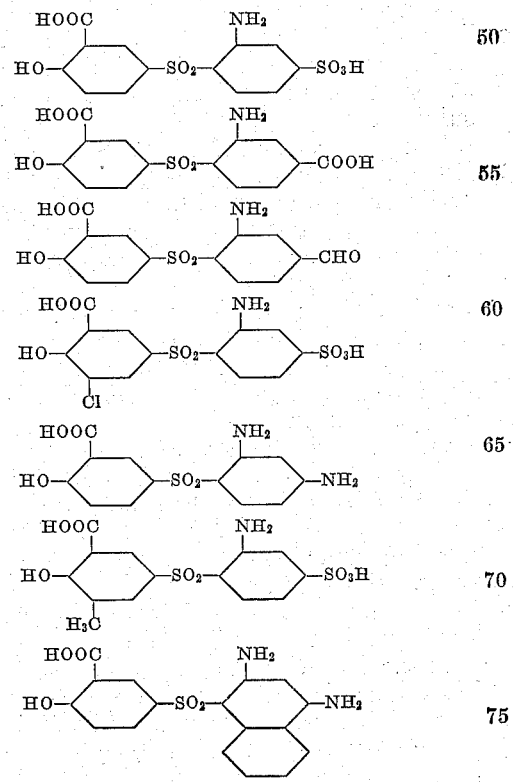

Generic formulæ which can be used to represent several or all of the monoamino compounds included in the above table are:

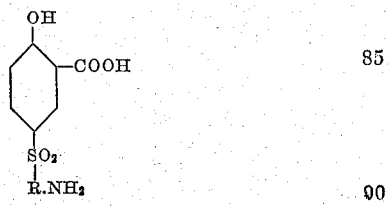

wherein R is an aromatic residue which may be further substituted; or:

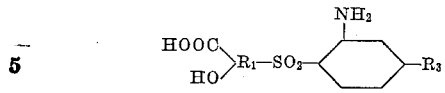

wherein $R_1$ represents a benzene residue which may be further substituted and in which the —OH and the —COOH groups are ortho to each other and $R_3$ represents a substituent group; or:

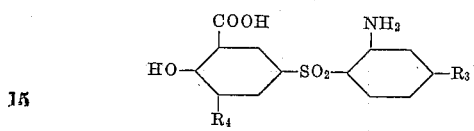

wherein $R_3$ and $R_4$ represent hydrogen or substituent groups.

The mordant-fixing portion of the compound molecule usually carries hydroxyl and carboxyl. I regard it as advantageous to have the hydroxyl and carboxyl in ortho position to each other in the aryl group in which they occur. In the other group, specifically different results follow from having 1 or 2 amino groups present. In the present application, I shall specifically claim monoamino sulphones.

These intermediates may be regarded as mixed sulphones carrying two different aromatic groups, one of which contains one or more —$NH_2$ groups, while the other does not but carries a chrome-fixing group. The —$NH_2$ group may be diazotized in any of the usual ways to give a chromophore. The chromophoric or dye portion of the molecule is, however, screened from the mordant-fixing portion of the molecule by a sulphone bridge, so that fixation of the dye by the mordant takes place without great change in shade in dyeing. Any hydroxy-, amino- or amino-hydroxy compound capable of coupling may be used as the second component, the choice being determined by the shade or properties (e. g. solubility or fastness to chlorine) of the required dyestuff. Dis- or polyazo-dyestuffs may be built up if desired.

In the following examples I have set forth in some detail certain methods of making intermediates within the present invention.

*Example 1.*—10 parts of salicylic sulphinic acid, 13 parts of the sodium salt of 4-chloro-3-nitrobenzenesulphonic acid, 5.3 parts of sodium carbonate, and 25 parts of water are boiled together for some hours, the solution becoming deep orange as combination proceeds. The sulphone which has been produced may be isolated either by acidifying the hot solution or by forming the barium salt and evaporating to crystallization when a pale yellow granular substance, readily soluble in warm water, is obtained.

*Example 2.*—42.5 parts of the sodium salt of the nitro sulphone obtained in Example 1 are dissolved in 150 parts of water and gradually added at 95° C. with good stirring to a suspension (previously etched by boiling for 5 minutes) of 17 parts of fine iron filings in 25 parts of water containing 0.1 parts of hydrochloric acid. When all the nitro sulphone solution has been added reduction is allowed to proceed for 3 hours, at 95–100° C. Sufficient strong caustic liquor is then added to make the mixture definitely caustic alkaline and after boiling for a short time the precipitated iron oxide is filtered off. The amino sulphone—in practically pure white condition—is precipitated by treatment of the cooled filtrate with mineral acid.

2-amino-4'-hydroxy-3'-carboxy-diphenyl-sulphone-4-sulphonic acid is fairly soluble in water and easily soluble in alkalies. In solution it gives a bluish red coloration with dilute aqueous ferric chloride. When treated with nitrous acid in the usual manner it forms a sparingly soluble light yellow diazo compound which couples very rapidly with the usual coupling components to form azo dyestuffs.

The nitrosulphone may be chlorinated before reduction by the action of a hypochlorite of an alkali metal in the well known manner. It is to be supposed that chlorination occurs in the vacant position ortho to the hydroxy group.

*Example 3.*—If in Example 1 the 10 parts of 5-sulphino salicylic acid are replaced by 10.8 parts of 5 sulphino 3 methyl-2-hydroxybenzene carboxylic acid (obtained, for example, by reduction by means of zinc dust in alcohol of the sulphonylchloride derived from o-cresotinic acid) the condensation results in the formation of a higher homologue of the nitrosulphone obtained in Example 1.

*Example 4.*—The nitro sulphone obtained in Example 3 may be reduced to the corresponding amino sulphone according to the method outlined in Example 2. The equivalent amount of its sodium salt (43.9 parts) dissolved in 150 parts of water are used.

The mono-amino sulphones of this invention occur as well defined colourless crystalline substances when obtained by crystallizing the alkali metal salts from water; they give a red coloration with dilute aqueous ferric chloride solution and their diazo compounds are usually of a pale yellow colour sparingly soluble in water.

While the subject matter of the present application relates specifically to the monoamino sulphones, it also includes the monoacylated diamino sulphones which may be formed (as described in Example VIII of my acknowledged copending application Ser. No. 53,404) by boiling a diamine with excess oxalic acid until nitrous acid no longer gives a brown dyestuff but a pale yellow diazo compound. To represent the structure of the compounds thus formed, $R_3$ of the structural formulæ given ante may represent an oxalylated amino group.

What I claim and desire to secure by Letters Patent is:—

1. As new compositions of matter monoamino derivatives of diaromatic sulphones, one aromatic group being a benzene residue and carrying ortho hydroxyl and carboxyl groups and the second aromatic group being a residue selected from a class consisting of benzene and naphthalene monoamino compounds, the said amino derivatives being well-defined, colorless crystalline substances, fairly soluble in water and easily soluble in alkalies, dissolving in dilute aqueous ferric chloride with a red coloration and giving, when treated with nitrous acid sparingly soluble pale yellow diazo compounds, which couple very rapidly with the usual coupling components to form chromable azo dyes.

2. As a new composition of matter, 2-amino-4'-hydroxy-3'-carboxydiphenylsulphone-4-sulphonic acid, which has the probable formula

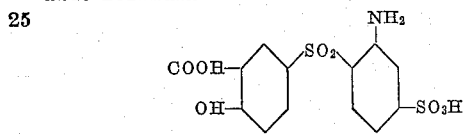

3. As new compositions of matter the monoamino diaromatic sulphones having the probable formula

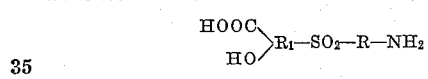

wherein $R_1$ represents a benzene residue and R represents a benzene or naphthalene residue both of which may be further substituted, and in which the OH and COOH groups are ortho to each other.

4. As new dyestuff intermediates, amino sulphones having the probable formula

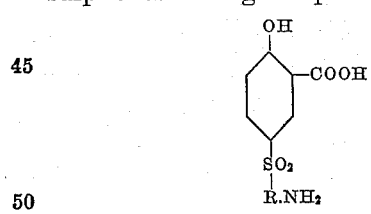

wherein R is an aromatic residue which may be further substituted.

5. In the manufacture of azo dyestuff intermediates, the process which comprises condensing a 5-sulphino salicylic acid with an aromatic mono-nitro compound having a labile halogen atom and reducing the nitro sulphone formed to a mono-amino sulphone.

6. In the manufacture of azo dyestuff intermediates, the process which comprises condensing the sulphinic acid derivative of a benzene o-hydroxy-carboxylic acid with a reactant selected from a class consisting of benzene and naphthalene mono-nitro compounds and reducing the nitro group in the resulting nitrosulphone.

7. As new dyestuff intermediates, amino sulphones having the probable formula

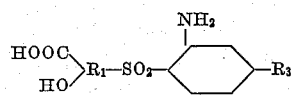

wherein $R_1$ represents a benzene residue which may be further substituted and in which the —OH and —COOH groups are ortho to each other and $R_3$ represents a substituent group.

8. As new dyestuff intermediates, amino sulphones having the probable formula

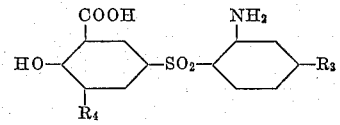

wherein $R_3$ represents a substituent group and $R_4$ represents hydrogen or a substituent group.

9. As new dyestuff intermediates, amino sulphones having the probable formula

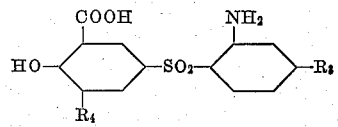

wherein $R_3$ represents —$SO_3H$, —CHO, —COOH, —$NH_2$ or an oxalylated amino group, and $R_4$ represents —H, —Cl, or —$CH_3$.

10. As new dyestuff intermediates, amino sulphones having the probable formula

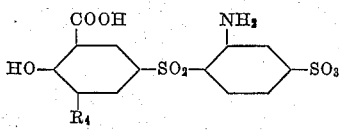

wherein $R_4$ represents —H, —Cl, or —$CH_3$.

In witness whereof I affix my signature.

KENNETH HERBERT SAUNDERS.